United States Patent
Zanella et al.

(10) Patent No.: US 11,167,428 B2
(45) Date of Patent: Nov. 9, 2021

(54) SUCTION-TYPE GRIPPING DEVICE

(71) Applicant: C.R.F. Società Consortile per Azioni, Orbassano (IT)

(72) Inventors: Alessandro Zanella, Orbassano (IT); Matteo Zoppi, Genoa (IT); Francesco Orzelli, Genoa (IT); Giorgio Pietronave, Genoa (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 242 days.

(21) Appl. No.: 16/429,290

(22) Filed: Jun. 3, 2019

(65) Prior Publication Data

US 2019/0366559 A1 Dec. 5, 2019

(30) Foreign Application Priority Data

Jun. 5, 2018 (EP) .................................. 18176123

(51) Int. Cl.
*B25J 15/06* (2006.01)

(52) U.S. Cl.
CPC .................. *B25J 15/0683* (2013.01)

(58) Field of Classification Search
CPC ............... B25J 15/0616; B25J 15/0641; B25J 15/0666; B25J 15/0683; B66C 1/0218; B66C 1/0293; Y10S 901/40
See application file for complete search history.

(56) References Cited

U.S. PATENT DOCUMENTS

| 4,200,272 A * | 4/1980 | Godding | B23Q 1/035 269/26 |
|---|---|---|---|
| 7,717,482 B2 * | 5/2010 | Iwasaki | B65G 21/2036 294/64.3 |
| 9,120,232 B1 * | 9/2015 | Wong | B25J 15/0616 |
| 2013/0026775 A1 * | 1/2013 | Sydorko | B25J 15/0616 294/183 |
| 2016/0016318 A1 * | 1/2016 | Kawata | B25J 15/0616 294/188 |
| 2018/0057285 A1 * | 3/2018 | Hukelmann | B25J 15/0616 |

FOREIGN PATENT DOCUMENTS

| EP | 1256421 A1 | 11/2002 |
|---|---|---|
| EP | 1508404 A2 | 2/2005 |
| EP | 1508404 A3 | 5/2009 |
| EP | 2745987 A2 | 6/2014 |
| EP | 2745987 A3 | 10/2015 |
| JP | H0538693 A | 2/1993 |
| JP | 2011177848 A | 9/2011 |
| WO | WO-2007045343 A1 * | 4/2007 ........... B28D 5/0094 |

OTHER PUBLICATIONS

European Search Report dated Dec. 6, 2018. 3 pages.

* cited by examiner

*Primary Examiner* — Dean J Kramer
(74) *Attorney, Agent, or Firm* — RMCK Law Group PLC

(57) ABSTRACT

Described herein is a suction-type gripping device including a suction-cup and configured for handling a component, for example a sheet-metal component for a motor vehicle. The device includes a plurality of pins that can slide with respect to the suction cup. The pins define a variable-geometry bed configured for reproducing the geometry of the component to be handled.

17 Claims, 11 Drawing Sheets

SUCTION-TYPE GRIPPING DEVICE

CROSS-REFERENCE TO RELATED APPLICATION

This application claims priority to European Patent Application No. 18 176 123.0 filed Jun. 5, 2018. The disclosure of the above application is incorporated herein by reference in its entirety.

FIELD OF THE INVENTION

The present invention relates to suction-type gripping devices, in particular provided with a suction cup. The invention has been developed with particular reference to suction-cup gripping devices for handling motor-vehicle components on an assembly line.

PRIOR ART

Handling of the sheet metal for motor-vehicle manufacture on an assembly line is today carried out practically completely via mechanical gripping devices referred to as "grippers".

Grippers generally comprise a frame with mechanized jaws configured for coupling to the wrist of a manipulator robot, and in which the jaws are arranged in pre-set points for gripping on specific areas of a component to be handled. This leads to a substantial rigidity of configuration of the grippers, given that the position of the jaws is rigid in so far as it is determined on the basis of the geometry of the specific component to be handled. In other words, a gripper cannot typically function as gripping equipment of a universal type. The following example regards to handling of the sheet metal for the mudguards of a motor vehicle, a typical case of a component that is "mirrored" on the two sides of the vehicle, and in so far as said geometry differs according to whether it is to be mounted on the left or on the right.

For instance, if a certain gripper is configured for handling the sheet for the right-hand mudguard, it cannot be used for handling the sheet for the left-hand mudguard because it has a different geometry (the reverse applies to the gripper for handling the left-hand mudguard).

Moreover, neither of the two grippers in question can be used for handling sheets for mudguards of a different vehicle.

In the case of mirrored components, the solution commonly adopted is to provide a double gripper, which has both arrangements of jaws that ensure, individually, coupling with the right-hand and left-hand components. This clearly increases considerably the overall dimensions and weights of the gripper, and in certain cases requires even an oversizing of the robot. There is, however, a technological limit: for handling very extensive mirrored components (for example, the two right and left sides of a motor vehicle) it is simply unthinkable to envisage a double gripper, so that it is necessary to resort to a pair of mirrored grippers that are selected, as required, by the robot. This entails, as a result, the need to provide a tool magazine for storing the grippers, as well as implying a higher degree of complication in planning the work cycle, along with higher costs of production of the motor vehicle.

As an alternative to the use of grippers, there may be envisaged the use of suction-type gripping devices comprising a suction cup. Even though theoretically they may be said to be intrinsically more universal than grippers with mechanical jaws, in actual practice even gripping equipment provided with a kit of suction cups is assembled specifically for the component to be handled, envisaging a plurality of suction cups of small dimensions positioned in a way resembling what occurs with the mechanized jaws of grippers.

The use of one or more suction cups of a large extension (in a number smaller than in the case of equipment provided with suction cups of small diameter) is generally not a practicable solution since it does not guarantee accurate positioning of the component with respect to the suction cup.

In detail, the conditions of contact between the component and the suction-cup can vary locally according to the curvature of the component, and the position of the component within the suction cup may consequently vary.

This generates, as a result, a lack of uniformity of the action of suction at the moment of application of the suction pressure within the suction cup, with a high risk of giving rise to shifting of position of the component, for example owing to onset of non-balanced moments, with total loss of the geometrical reference. Added to this is a precision of positioning that is already intrinsically reduced on account of the greater compliance of the elastomeric material of the suction-cup as compared to a mechanical jaw.

OBJECT OF THE INVENTION

The object of the present invention is to overcome the technical problems mentioned above. In particular, the object of the invention is to provide a suction-type gripping device that will be substantially universal, will reduce or eliminate the problems of precision of positioning, whatever the component to be handled, and will reduce or eliminate the risks of deformation of the component being handled.

SUMMARY OF THE INVENTION

The object of the present invention is achieved by a suction-type gripping device, handling equipment, and a method that present the characteristics forming the subject of the ensuing claims, which constitute an integral part of the technical teaching provided herein in relation to the invention.

BRIEF DESCRIPTION OF THE DRAWINGS

The invention will now be described with reference to the annexed drawings, which are provided purely by way of non-limiting example and in which.

DETAILED DESCRIPTION

Figure 1:
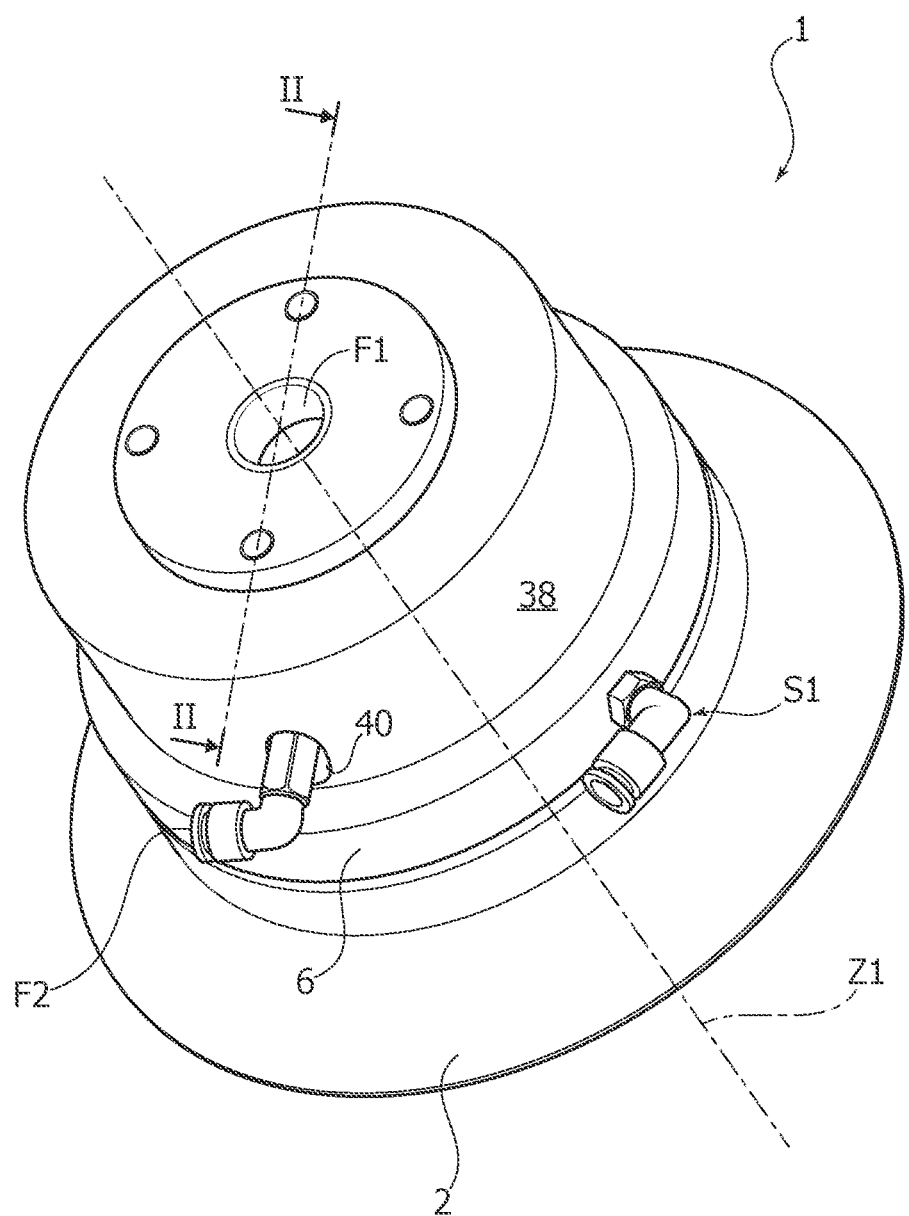
FIG. 1 is a perspective view of assembly of a suction-type gripping device according to the invention.
Figure 2:
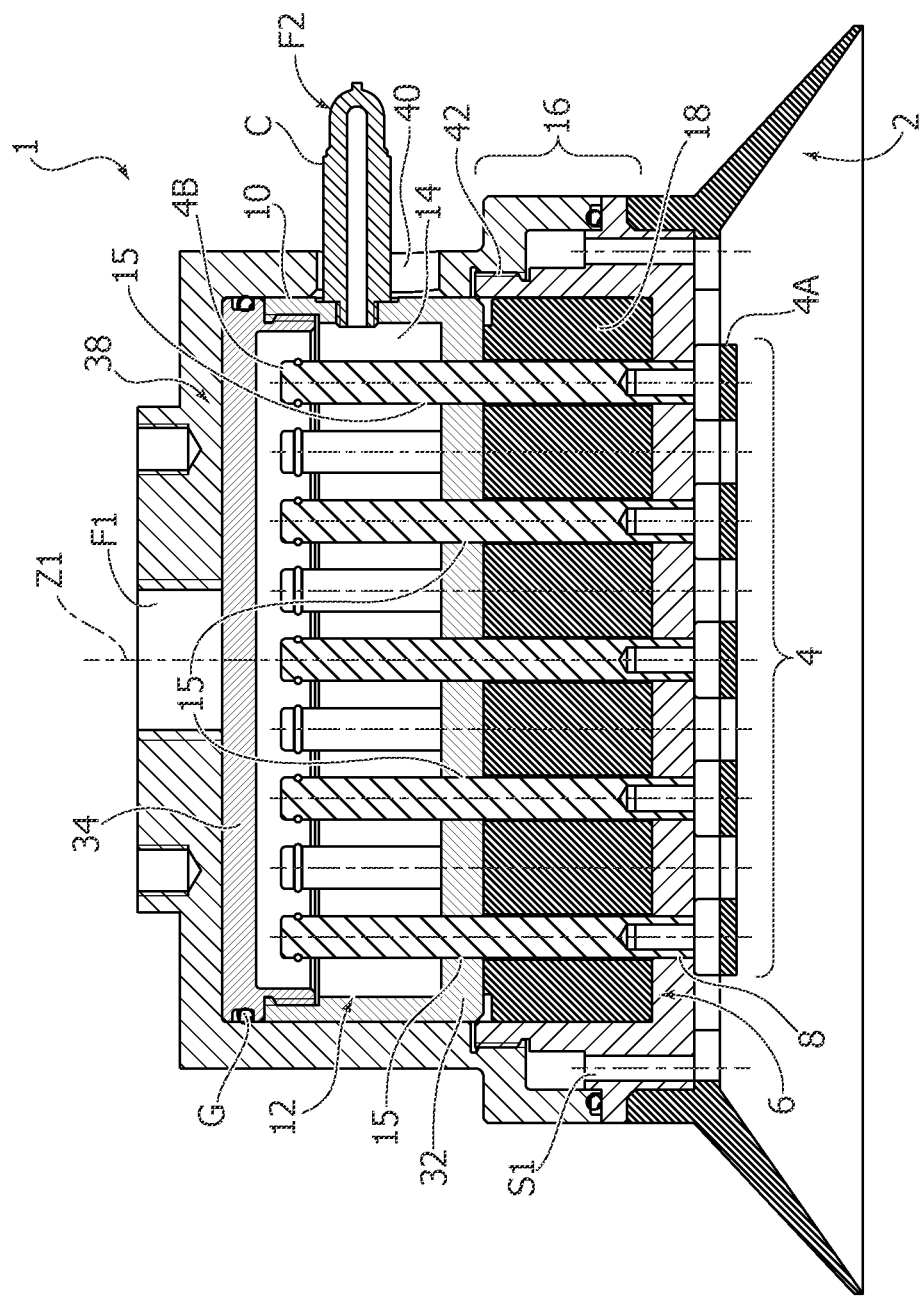
FIG. 2 is a cross-sectional view according to the trace II-II of FIG. 1.

With reference to FIG. 1, number 1 designates as a whole a suction-type gripping device according to a preferred embodiment of the invention. With reference to FIG. 2, the suction-type gripping device 1 comprises a suction-cup 2 and a plurality of pins 4, which are axially mobile with respect to the suction-cup 2 and have a first end 4A that faces the inside of the suction-cup 2. The suction-cup 2 is coupled to a guide matrix 6, which comprises a first arrangement of holes 8, in particular through holes, each housing a respective pin 4 mounted axially slidable. The arrangement of holes may comprise, for example, a quincuncial scheme, the envelope of which is contained within the circular perimeter of the guide matrix 6.

Mounted axially mobile in a first chamber 10 is a piston 12, and the chamber 10 can be supplied by means of a first supply port F1 for axial movement of the piston 12 itself.

Except where expressly indicated otherwise, the axial direction of movement of the piston 12 and of the pins 4 is a direction parallel to a longitudinal axis Z1 of the gripping device 1. The supply port F1 in this embodiment shares, moreover, the axis Z1.

A second chamber 14 is provided within the piston 12, which preferentially has a structure that can be taken apart (as will be detailed in what follows). The second chamber 14 receives second ends 4B of the pins 4, where the ends 4B are opposite to the ends 4A. For this purpose, provided on a wall of the piston 12 (and of the chamber 14) that is traversed by the pins 4 is a second arrangement of holes 15 identical to the first arrangement of holes 8 on the guide matrix 6.

The second chamber 14 can be supplied by means of a second supply port F2 that is incident, in particular orthogonal, to the direction of the axis Z1. By means of the second supply port it is possible to provide, as will be seen hereinafter, for axial movement of the pins 4.

A locking assembly 16 is set between the guide matrix 6 and the piston 12. The locking assembly 16 is traversed by the pins 4 and is configured for exerting an action of radial constriction on the pins 4 in response to an axial deformation imparted by means of the piston 12.

Some preferred embodiments of the components mentioned previously in the description will now be examined in detail.

The guide matrix 6, as may be seen in FIG. 2, is preferably obtained as a first cup-shaped element that extends for part of the axial extension of the device 1 and that houses the locking assembly 16 within it.

Figure 3:
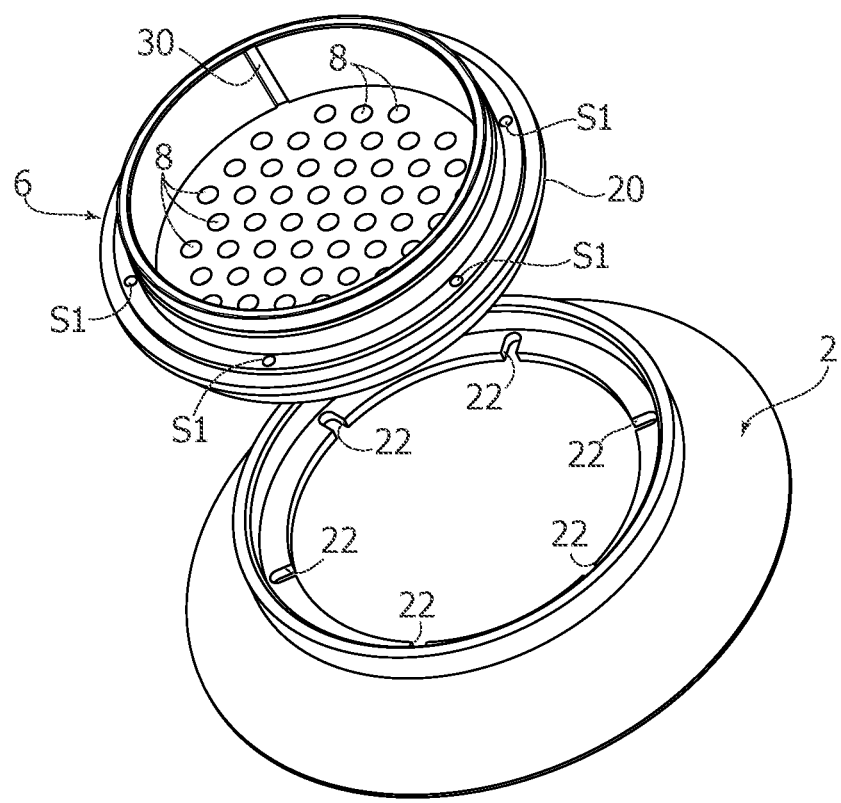
FIG. 3 is an exploded perspective view of a subassembly of components of the device of FIG. 1.

As may be seen in FIG. 3, the guide matrix 6 comprises a collar 20 that functions as reference for fixing of the suction-cup 2, preferably with screws that engage slots 22 at the port of the suction-cup 2 itself, and that likewise functions as frame for providing one or more suction ports S1 (obtained, once again preferentially, by means of interpenetrating axial and radial holes provided on the wall of the guide matrix 6) by means of which it is possible to connect the suction-cup 2 to a negative-pressure source.

Figure 4:
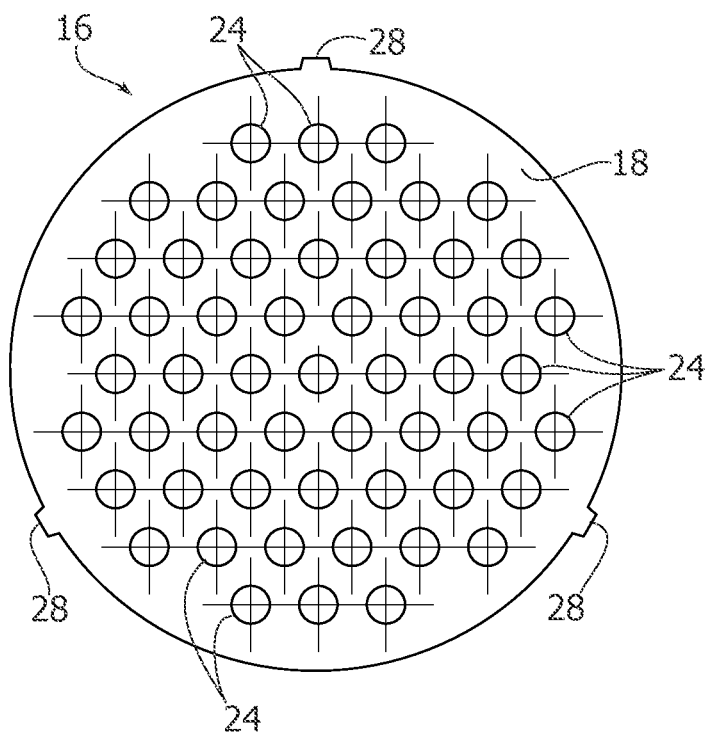
FIGS. 4 and 5 are a view from above and from below, respectively, of a component of the device of FIGS. 1 and 2.
Figure 5:
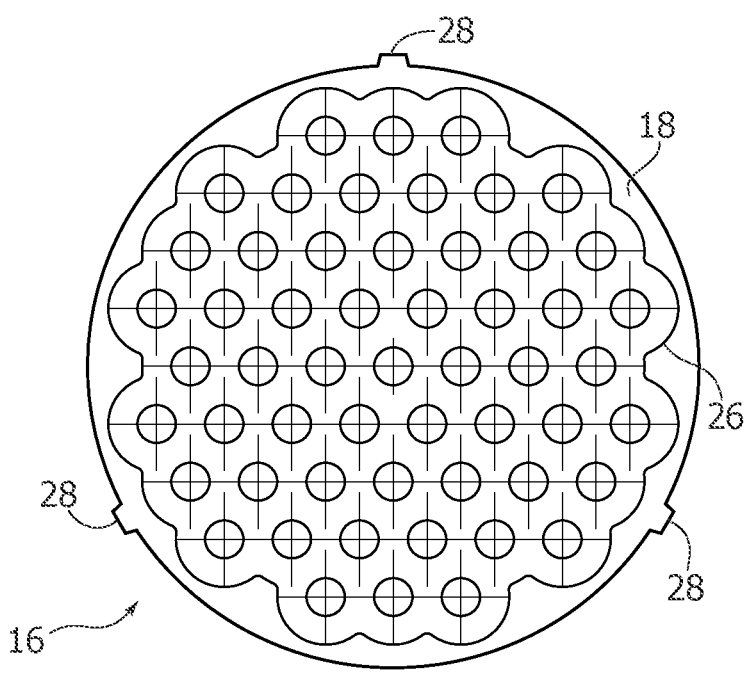

With reference to FIGS. 4 and 5, the locking assembly 16 preferably comprises a cushion 18 of elastomeric material including a third arrangement of holes 24 (through holes like the holes 8 and 15), which is also identical to the first and second arrangements of holes 8.

The holes 24 are configured for providing an at least partial reduction in diameter, if need be, of an axial deformation of the cushion 18 imparted by means of the piston 12. As may be seen in FIG. 4, the bottom face of the cushion 18 is integrally plane in order to provide a uniform contact with the bottom of the guide matrix 6, whereas the top face visible in FIG. 5 can optionally have a multi-lobed projection 26 that projects with respect to the surface of the cushion 18 for a small amount, typically from 0.5 mm to 1 mm (ends included), and that facilitates mounting of the device 1.

On the lateral surface of the cushion 18 there are moreover provided one or more angular-position references, preferably formed as ribs 28 in relief on the lateral surface of the cushion 18. The ribs 28 are configured for engaging corresponding grooves 30 on the inner wall of the guide matrix 6.

Of course, it is possible to envisage a specular configuration, i.e., ribs in relief on the wall of the guide matrix 6 and grooves on the side wall of the cushion 18.

Provision of angular-position references—a measure that applies in a generalised way to all the components that are traversed by the pins 4—serves to prevent any misalignment also of modest degree between the through holes that are traversed by the pins 4, in so far as this misalignment (defects of alignment) are liable to hinder significantly axial sliding of the pins 4.

Figure 6:
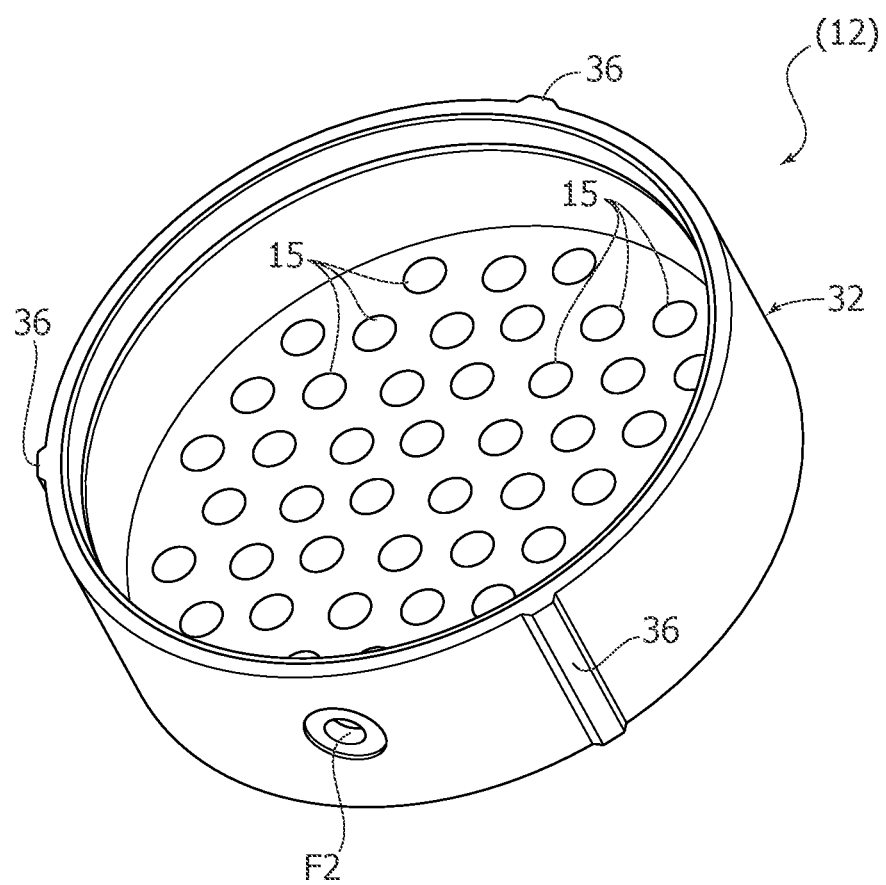
FIG. 6 is a perspective view of a further component of the device of FIGS. 1 and 2.

With reference to FIG. 6 in combination with FIG. 2, the piston 12 is preferably provided as element that can be taken apart and includes a first shell 32 and a second shell 34 coupled together. The first shell 32 is obtained as a cup-shaped element, whereas the second shell 34 is substantially obtained as a threaded plug screwed on the cup-shaped element 32. The first shell 32 comprises the second arrangement of holes 15 on the bottom thereof.

Moreover provided on the side wall of the shell 32 is the supply port F2, which is in particular provided with a seat for a small tube C by means of which the port F2 is connected to an air-supply pipe.

Moreover provided once again on the side wall of the shell 32, in an external position, are one or more angular-position references 36. As described regarding coupling between the guide matrix 6 and the cushion 18, also the angular-position references on the shell 32 are preferably provided as ribs 36 in relief on the lateral surface of the shell 32.

The ribs 36 are configured for engaging corresponding grooves on the inner wall of a further cup-shaped element 38 that delimits the chamber 10 at the top thereof. Of course, it is possible to envisage a mirror-like configuration, i.e., ribs in relief on the inner wall of the cup-shaped element 28 and grooves on the side wall of the piston 12.

Provided on the lateral surface of the cup-shaped element 38 is a through opening (slot) 40 having an elongated shape oriented in an axial direction, which is traversed in use by the tube C.

In this regard, the piston 12 is mounted slidable with respect to the cup-shaped element 38 by interposition of an annular sealing gasket G set between the first supply port F1 and the opening 40 so as to separate the environment immediately downstream of the supply port F1 (and directly in view of the surface of influence of the piston 12) from the underlying area where the locking device 16 is housed and from the opening 40 itself.

The elongated shape of the opening 40, or equivalently of a radial hole of diameter equal to the axial length of the opening itself, enables the latter to follow the axial movement of the piston 12—with respect to which the tube C is fixed—during the use of the device 1.

The cup-shaped element 38 is coupled by means of a threaded joint 42 to the guide matrix 6, thereby defining a single environment that substantially corresponds to the chamber 10 and contains the piston 12 and, immediately underneath it, the cushion 18. Alternatively, it is possible to provide coupling between the element 38 and the guide matrix 6 by means of two collars—one for each component—joined by means of a brace.

Figure 7:
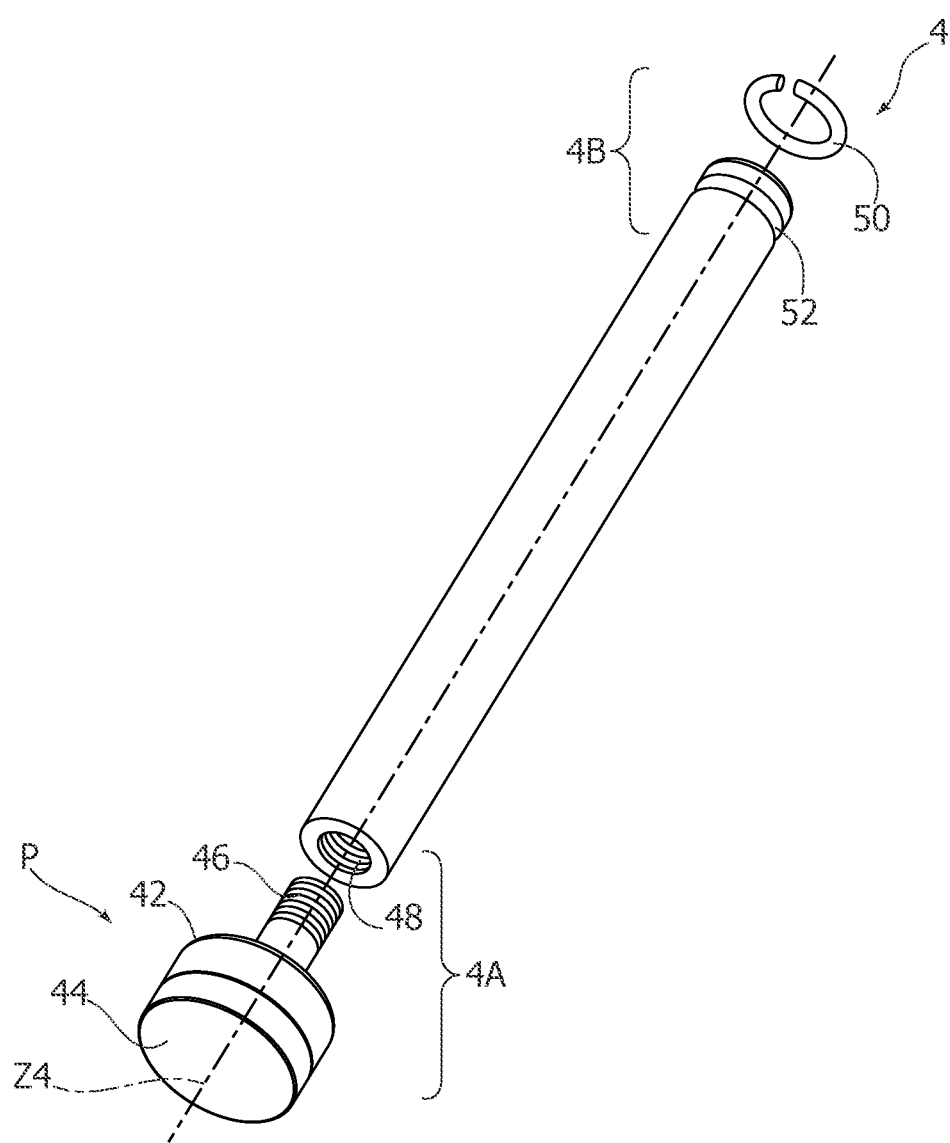
FIG. 7 is a perspective view of yet a further component of the device of FIGS. 1 and 2.

Finally, with reference to FIG. 7 each pin 4 comprises at the end 4A a foot 42, coupled to which is a buffer 44, the latter being made of elastomeric material.

The ensemble constituted by the foot 42 and by the buffer 44 is separable from the pin 4, for example by providing a threaded stem 46 on the foot 42 that engages a corresponding thread 48 within the pin 4 so as to facilitate the operations of maintenance of the pins 4, for example in the case of wear of the buffer 44.

Provided, instead, at the end 4B is an arrest device, which may comprise a circlip 50 (as in the embodiment of FIG. 7), which engages in an annular groove 52 at the end 4B. Alternatively, the arrest device may comprise a local increase in diameter, for example, obtained by deformation (squeezing) of the end 4B.

The axial travel of the pins 4 in the direction that brings about retraction thereof into the chamber 14 is limited by the abutment the feet 42 and the bottom face of the guide matrix 6. If this axial travel is such that in the position of maximum retraction there is no contact between the ends 4B and the wall of the chamber 14 inside the piston 12, i.e., the inner wall of the shell 34, then it is possible to make the ends 4B of the pins 4 completely flat since the air that penetrates into the chamber 14 will in any case be able to intercept the surfaces of influence of the pins 4 at the ends 4B.

Instead, if the axial travel is such that contact is made between the ends 4B and the wall of the chamber 14 inside the piston 12, i.e., the inner wall of the shell 34, then the terminal surface of the ends 4B is provided with a surface engraving in such a way as to allow the air supplied to the chamber 14 to impinge upon the surface of influence of the pin 4 at the end 4B also when this is in contact with the inner wall of the piston 12 to enable axial displacement thereof.

Operation of the gripping device 1, and more in general of gripping and handling equipment provided with a plurality of devices 1, is described in what follows.

The device 1 enables handling of components, mainly with a plate-like or shell-like structure (including, clearly, sheet-metal components for motor vehicles), providing a bed of pins that reproduces the curvature of the surface of the component in a gripping area. This renders the condition of contact between the suction-cup 2 and the surface of the component extremely predictable at the moment of application of suction pressure, and limits as far as possible or altogether eliminates any shifting of the component with respect to the suction-cup 2.

In use, the device 1 is brought into contact with the surface of the component around the gripping area. In the case where the device 1 is installed on board gripping equipment, handling is obtained by means of a manipulator robot that positions the suction-cup at a known and pre-set height with respect to the surface of the component, the height at which contact is certainly made between the suction-cup 2 and the surface of the component along the entire perimeter of the suction-cup itself.

According to the local curvature, the surface of the component in the gripping area will set itself with a variable positioning within the suction-cup 2 itself, and consequently with a variable distance from the surface of the guide matrix 6 bearing upon which are the pins 4 when they are in a completely retracted position.

Once this step is through, the second chamber 14 is then supplied with fluid (air) under pressure through the port F2, causing advance of the pins 4 until the ends 4A, and in particular the buffers 44, come into contact with the surface of the component. It should, however, be borne in mind that it is possible to carry out the step of supply of the second chamber 14 prior to the entire procedure. In particular, it is possible to pressurise the chamber 14 so as to bring the suction device up to the component to be handled already with the pins 4 in the extracted position. The pressure of supply of the chamber 14 is preferably kept at a medium-to-low level since the aim is merely to ensure contact between the pins 4 and the surface of the component, thus enabling recession of the pins 4 into the chamber 14 when the suction-cup 2 is coupled to the surface of the component.

Whatever the time at which the step of supply of the chamber 14 is carried out, the pins 4 will hence be found to be extracted from the guide matrix 6 to a variable extent according to the position of the surface of the component relative to the suction-cup 2, and the result in general will be that of as arrangement with variable extension of the pins 4, which reproduces the geometry of the component in the gripping area.

After this, the position of the pins 4 thus reached is blocked by means of the locking assembly 16. For this purpose, fluid (air) under pressure is introduced through the port F1 for controlling axial displacement of the piston 12 towards the suction-cup 2, with consequent axial compression of the cushion 18.

Axial compression of the cushion 18 causes an at least partial reduction of diameter of the holes 24 along the axial extension thereof since the sections of material of the cushion 18 between adjacent holes 24 tend to bulge outwards, expanding at the cavities constituted by the holes 24, thus exerting an action of braking and gripping on the pins 4 themselves, locking them in position.

With the pins 4 blocked in position, a suction pressure is then applied inside the suction-cup 2 by means of connection of the suction ports S1 to the negative-pressure source, thus obtaining coupling of the suction-cup 2 to the component and gripping of the latter by the device 1.

Any shifting or deformation of the component is thus prevented thanks to the fact that the bed of pins 4 blocked in position supports—like a backrest—the component reproducing the surface thereof, likewise limiting also any minor relative displacements thereof. In this sense, provision of the buffer 44 of elastomeric material at the end 4A contributes to rendering contact between the pins 4 and the surface of the component more stable in the gripping area, thus contributing to a further reduction of the risk of shifting.

Once the process of handling of the component is completed, the suction pressure within the suction-cup 2 is removed, and the pins 4 are released by interruption of supply of the chamber 10. This releases the action of axial compression on the cushion 18, restoring a uniform diameter for the holes 24. The device 1 is hence ready for a new gripping operation that takes place according to the modalities described previously.

Figure 8:
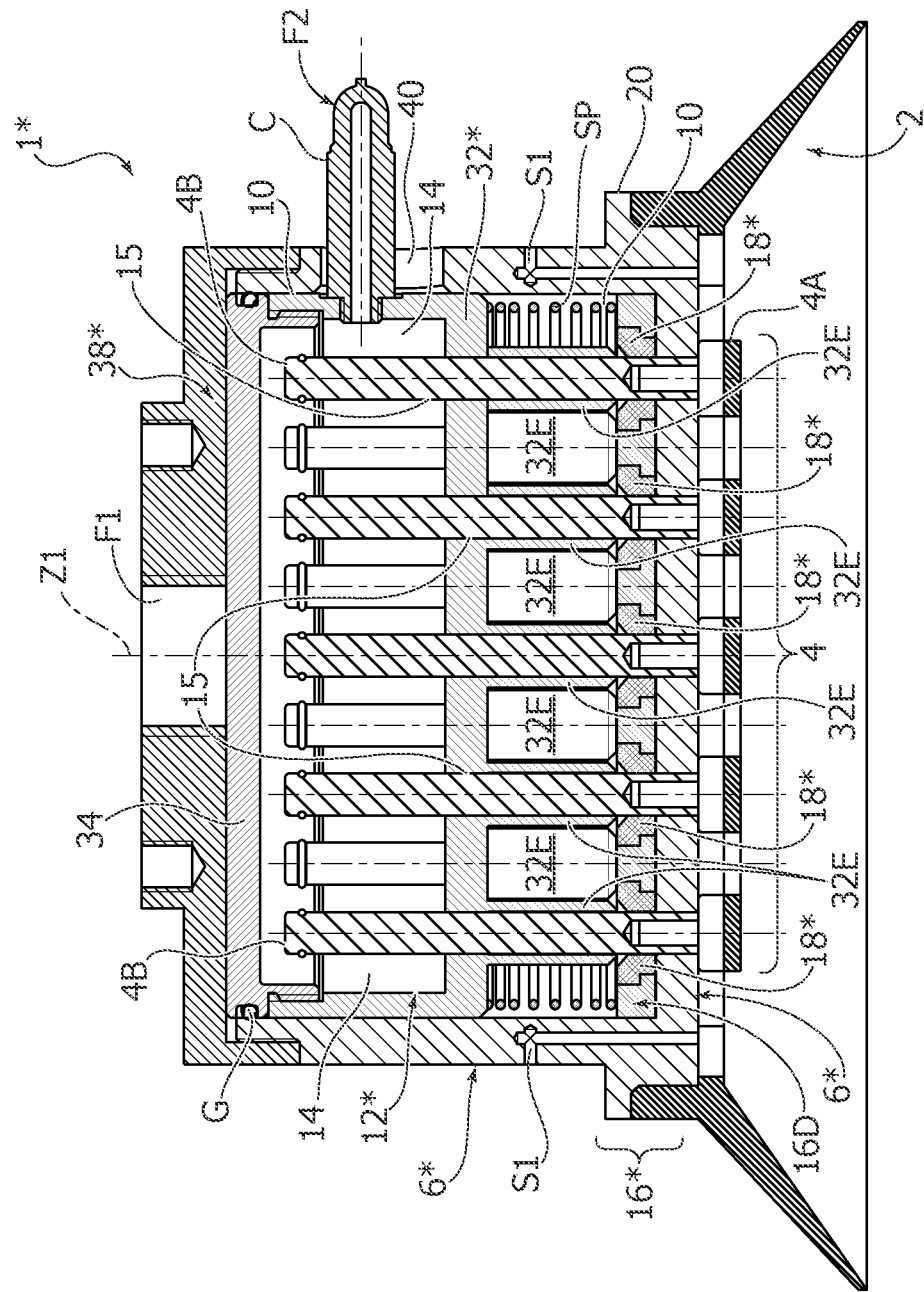
FIG. 8 is a cross-sectional view corresponding to that of FIG. 2, but referring to a further embodiment of the device according to the invention.
Figure 9:
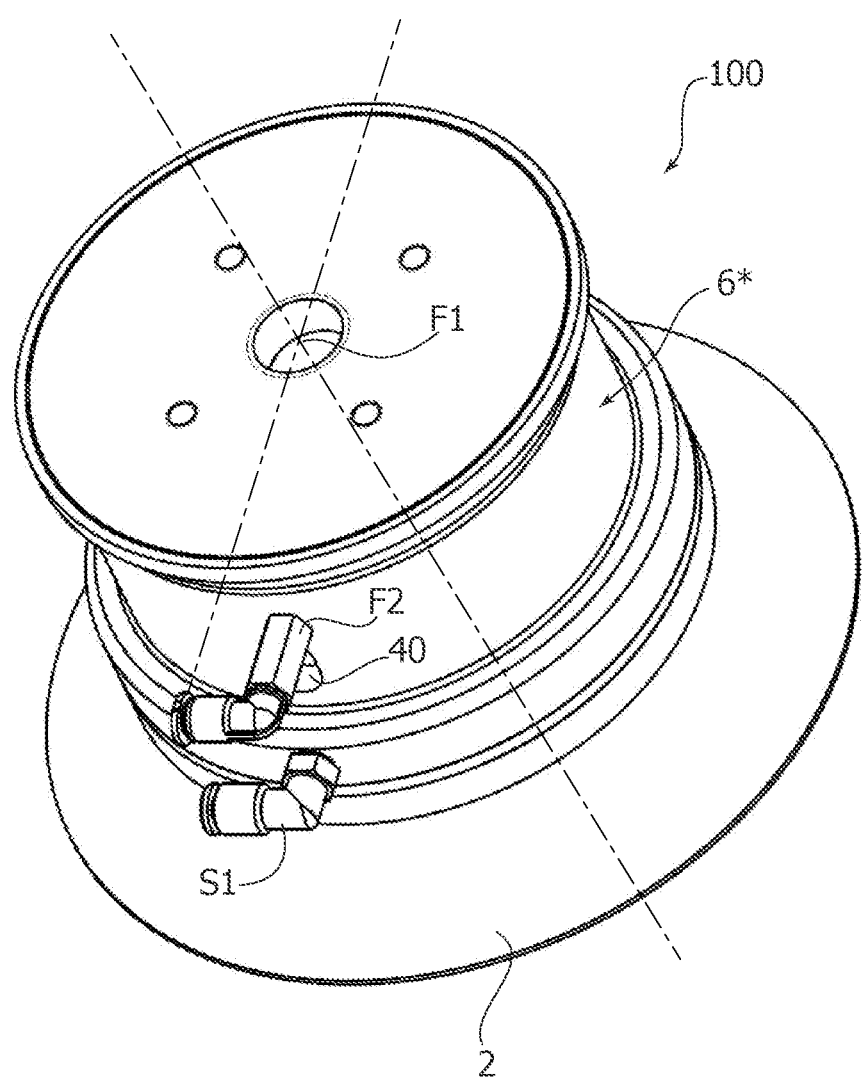
FIG. 9 is a view similar to that of FIG. 1, but referring to yet a further embodiment of the invention.

With reference to FIG. 8, a further embodiment will now be illustrated that combines altogether some variant embodiments of the components of the device 1. The device of FIG. 8 is denoted by the reference number 1*. All the reference numbers identical to the ones already adopted previously designate the same components.

A first difference that exists between the gripping device 1 and the gripping device 1* involves the guide matrix. In the device 1* the guide matrix 6* extends almost throughout the axial extension of the device, and in particular defines the entire lateral surface of the chamber 10. The latter is axially delimited by an end plate 38*, which is coupled to the guide matrix 6 at the end where the piston 12 is located, preferably by means of a threaded joint. Basically, the cup-shaped element 38 is eliminated, or rather it degenerates into the end plate 38*.

This embodiment of the guide matrix 6* simplifies assembly of the device 1* primarily because it is not necessary, during mounting, to push the piston 12 with the gasket G right to the bottom of the cup-shaped element 38, but it can be installed by inserting it from the open end of the matrix 6*, i.e., from the position where it would be located in any case in the resting position.

This is not the only advantage: with this embodiment, assembly of the device 1* is rendered easier also as regards alignment of the individual components traversed by the pins 4.

In fact, the potential problems of misalignment between the arrangements of first, second, and third holes that might hypothetically require minor corrections in assembly of the device 1 are ruled out simply by the fact that it is possible to provide a single set of angular-position references (grooves or ribs) on the inner surface of the guide matrix 6* and use it for angular alignment of the cushion 18 and the piston 12.

A further difference that exists between the device 1 and the device 1* involves the structure of the piston (here the piston 12*) and the locking assembly 16 (here the locking assembly 16*). In the embodiment of FIG. 8, the shell 32 of the piston 12* is replaced by a shell 32*, which comprises a plurality of axial tubular extensions 32E at the holes 15. The tubular extensions 32E can be integrally obtained with the shell 32*, or else can be applied mechanically.

Each axial tubular extension 32E fits on a respective pin 4 and is mobile relative thereto with the piston 12*.

The locking assembly 16 is here replaced by a locking assembly 16* that comprises a disk 16D having a fourth arrangement of holes that are the same in number and position as those of the first, second, and third arrangements, having, however, a larger diameter in order to accommodate inserts 18* of elastomeric material, as well as a flared port, which is also traversed by the pins 4. The inserts 18 are preferably withheld in the disk 16D by means of a shoulder provided in the holes of the fourth arrangement.

Set between the piston 12* and the disk 16D is an elastic element SP, preferably a cylindrical helical spring, which enables the piston 12* to be brought back into the resting position in contact with the bottom of the chamber 10 (the end plate 38*).

The flared ports of the inserts 18* are configured for interaction with rounded free ends of the tubular extensions 32E. In the case in point, with the axial movement of the piston 12* towards the locking assembly 16*, the extensions 32E come to impinge upon the flared ports, compressing the inserts 18* axially and causing a reduction in diameter of the inserts 18* themselves, which blocks the pins 4 in position when so required (i.e., when the suction-cup 2 has been positioned with respect to the gripping area and prior to application of suction pressure thereto). The action of locking, just to provide a comparison, at least roughly resembles what occurs in a fast-lock coupling for gardening purposes, where the same mechanism of deformation grips the seal between the two hydraulic connections that are connected. Once handling of the component is completed, the suction pressure in the suction-cup 2 is removed, and the piston 12* returns simultaneously into the resting position thanks to the action of the elastic element SP.

The advantage of this embodiment of the locking assembly lies in the fact that the axial extension of the channels with deformable walls in which the pins slide is smaller than in the case of the device 1. In the device 1*, the deformable channels are substantially reduced to just the stretch occupied by the inserts 18, whereas in the case of the device 1 the deformable channels occupy the entire thickness of the cushion 18.

Finally, it should be noted that—except where this gives rise to manifest incompatibility—the single differences here illustrated can be implemented individually; for example, it is possible to provide devices according to the invention that include the matrix 6*, housed inside which are the cushion 18 and the piston 12, or else that include the matrix 6, the cup-shaped element 38, the piston 12*, and the locking assembly 16*.

An example is illustrated in the sequence of FIGS. 9 to 13. The reference number 100 designates as a whole a third embodiment of the suction device according to the invention, which includes the matrix 6*, the piston 12, and the cushion 18. All the reference numbers identical to the ones previously adopted designate the same components already described. The suction device 100 is substantially identical to the device 1*, except for the elements that will now be described in detail.

Unlike the device 1*, the device 100 retains the locking assembly 16 and the cushion 18. However, the cushion 18 is not housed directly on the bottom of the guide matrix 6*, but rests on a disk 116D that replicates the arrangements of first, second, and third holes for guiding the pins 4. The disk 116D is conceptually similar to the disk 16D, but is without the inserts 18*.

Figure 10:
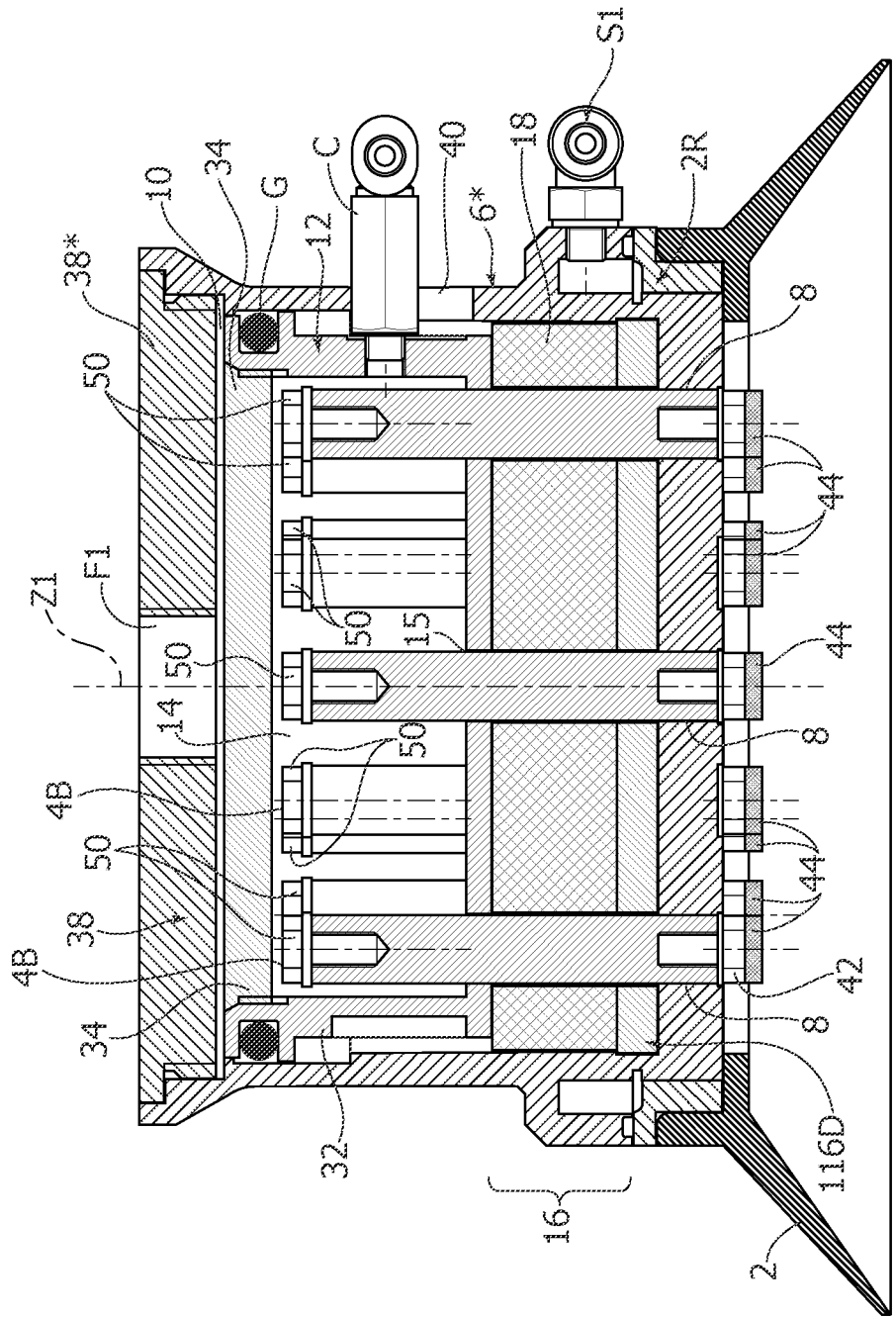
FIG. 10 is similar to FIG. 2 and to FIG. 8, but refers to the embodiment of FIG. 9.
Figure 11:
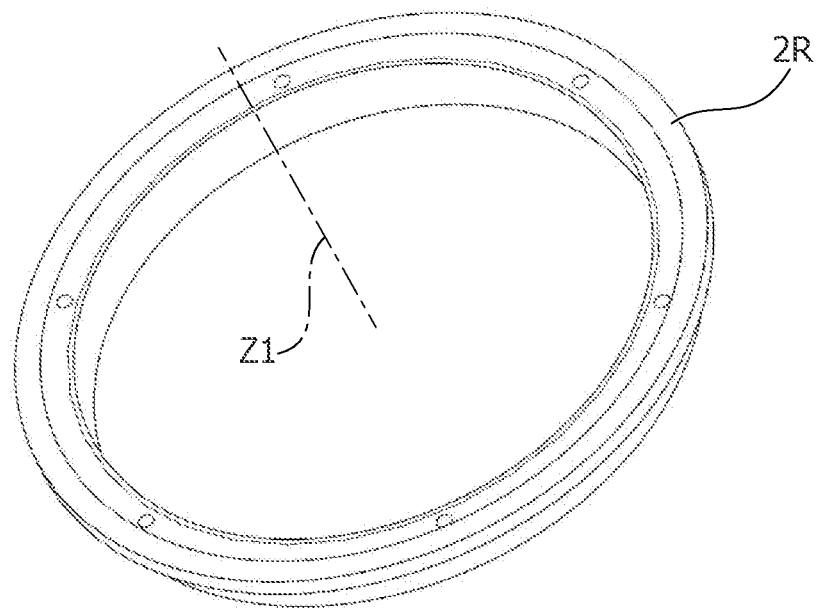
FIGS. 11, 12, and 13 are individual views of single components of the embodiment of FIG. 9, FIG. 12A being a (partially sectioned) view of the component of FIG. 12 according to the viewpoint defined by the arrow XII of FIG. 12.
Figure 12:
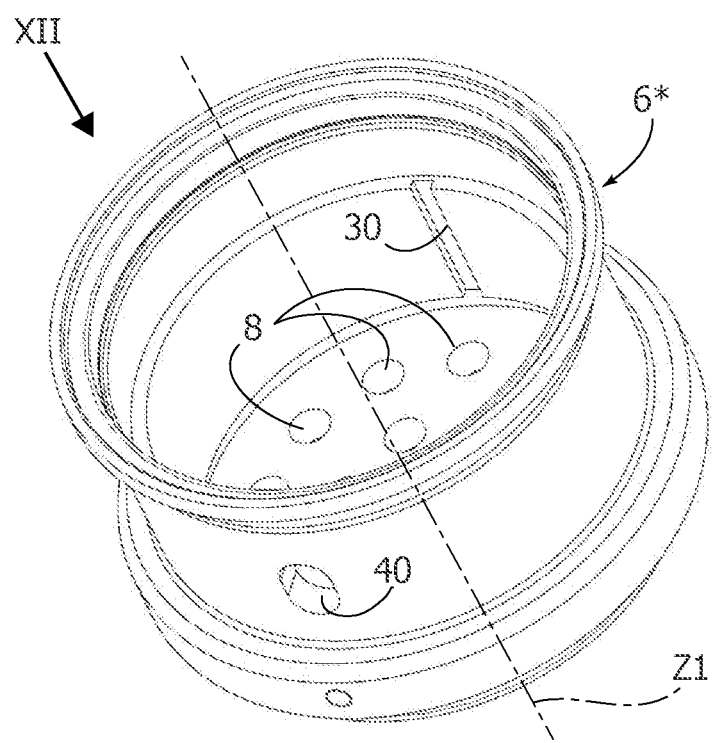
Figure 12A:
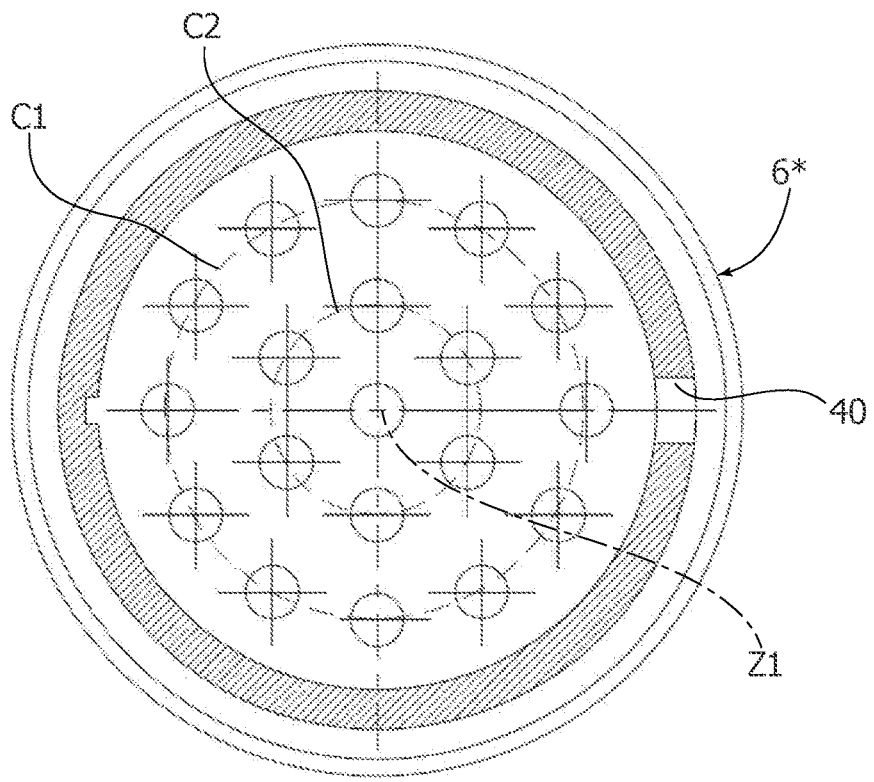
Figure 13:
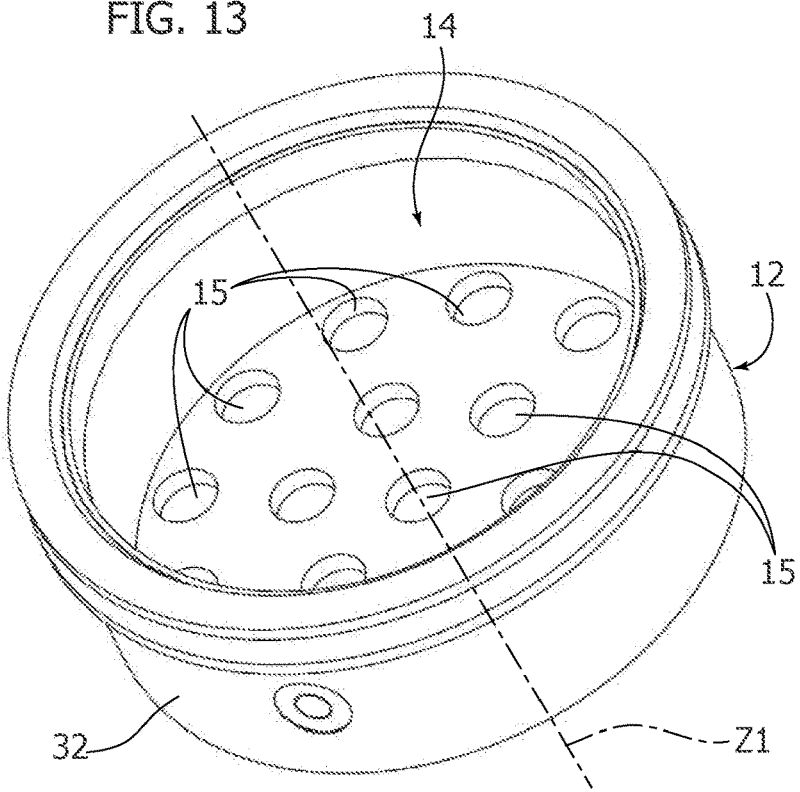

With reference to FIG. 12, as well as to FIGS. 10, 11, and 13, the arrangements of the first, second, and third holes in the device 100 are preferably obtained according to a scheme of concentric circumferences. For instance, as may be seen in FIG. 12A, the holes in which the pins 4 slide are arranged along a first circumference C1 and a second circumference C2—of diameter smaller than the circumference C1—and moreover in a position corresponding to the axis Z1 (single hole).

The suction-cup 2 is moreover fixed to the guide matrix 6* by means of a flange 2R (FIG. 11), which facilitates maintenance operations, and in particular removal of the suction-cup 2.

As regards the pins 4, nothing changes for the ends 4A, whereas the arrest element provided at the end 4B is here preferably obtained by means of a threaded element altogether similar to the foot 44, which is screwed into each pin 4 at the end 4B.

Operation of the suction device 100 is identical to that of the device 1, simultaneously affording all the advantages proper to the device 1*.

The person skilled in the sector will hence appreciate that the suction-type gripping device 1 enables substantially universal equipment to be provided that obviates the problems of flexibility and logistics that characterize equipment with mechanical jaws (grippers) described at the outset of the present description.

Thanks to the provision of the bed of pins 4, it is possible to use suction cups 2 of larger dimensions, covering in particular a range of dimensions (diameters) that cannot be used with suction-type devices based upon a simple suction-cup on account of the problems of lack of precision of positioning described above. Especially in the case of installation of the devices 1, 1* on handling equipment akin to a gripper, the arrangement of the devices 1, 1* on the equipment may be chosen so as to intercept gripping areas statistically representing a variety of components thanks to the dimensions of the suction cups 2, compensating for the possible negative effects in terms of precision of positioning by means of the bed of pins 4.

Moreover, the pins 4 make it possible to increase the gripping surface while maintaining the flexibility of the components to be handled, enabling an increase of gripping force.

And not only this, but the extreme flexibility of the device 1 renders possible application thereof in a large number of industrial sectors, where there are requirements of handling, as in a large number of work stations and/or sections of a motor-vehicle production line. The devices 1 can be used indifferently on a body-in-white line for handling items of bodywork of the vehicle, but may also be used, for example, at exit from a presswork station for handling the sheets that have just undergone pressing operations.

In the case of a body-in-white line, and in particular in the case of handling of mirrored components, the compactness and lightness of the devices 1, 1* can even enable provision of equipment with variable configurations for simple deactivation of suction cups. This means that it is possible to install on board the equipment a set of devices 1, 1* redundant with respect to the handling requirements of the single left-hand component or right-hand component, and in particular devised for covering the handling requirements of both components. In other words, a certain number of devices 1, 1* is rendered active in the case where it is necessary to handle a right-hand component, deactivating the remaining devices 1, 1* exclusive for the left-hand component. Instead, in the case of handling of the left-hand component, just the devices 1, 1* in common are kept active, and the ones exclusive for the left-hand component are simultaneously rendered active, deactivating the ones exclusive for the right-hand component.

Of course, the details of construction and the embodiments may vary widely with respect to what has been described and illustrated herein, without thereby departing from the scope of by the present invention, as defined by the annexed claims.

For instance, at the ends 4A of the pins 4 there may be provided only the buffer 42, without interposition of a foot to support it and connect it to the pin 4. In this case, the end 4A of the pin 4 is provided so as to offer an undercut in which a cap of elastomeric material engages, preferably of a spherical or in any case rounded shape, which fits to the end 4A.

In addition, in all the embodiments described herein the structure of the port F2 could be modified. Instead of a small tube that is directly grafted on the lateral surface of the piston 12*, 12, for which it is necessary to provide the slot 40 on the guide matrix 6* or on the cup-shaped element 38 in order to follow the movements of translation of the piston 12*, 12, the port F2 could be provided on the ceiling of the piston 12, i.e., on the face directly facing the first chamber 10. The inlet of the fluid is thus obtained orthogonal to the ceiling of the piston 12, and a small tube similar to the tube C is mounted axially slidable (the axis is parallel to the axis Z1, as well as to the axis of the port F1) within the end plate 38* or the bottom of the cup-shaped element 38, with a gasket configured for exerting an action of sealing with respect to slidable components. In this way, it becomes much easier to ensure fluid-tightness of the chamber 10 since the slot 40 can remain in any case subject to triggering of a potential seepage of fluid on account of the fact that the sealing action has to be exerted on a cylindrical surface.

What is claimed is:

1. A suction-type gripping device, comprising:
   a suction-cup;
   a plurality of pins, which are axially movable with respect to said suction-cup and have a first end that face an inside of said suction-cup;
   a guide matrix comprising a first arrangement of holes, each housing a respective pin of said plurality of pins in an axially slidable way, said suction-cup being coupled to said guide matrix;
   a first chamber, within which is set a piston that is axially mobile relative to said first chamber, said first chamber including a first supply port adapted to receive a supply of fluid for axial movement of said piston;
   a second chamber provided within said piston, said piston including a second arrangement of holes, each housing a respective pin of said plurality of pins in an axially slidable way, so that said second chamber receives second ends of the plurality of pins, wherein said second chamber is configured to be supplied with fluid by a second supply port for axial movement of said plurality of pins; and
   a locking assembly set between said guide matrix and said piston, said locking assembly being traversed by said plurality of pins and being configured for exerting an action of radial constriction on said plurality of pins in response to an axial deformation imparted by said piston,
   and wherein said suction-cup is in fluid communication with a suction port, which is configured for connection to a negative-pressure source.

2. The gripping device according to claim 1, wherein said locking assembly comprises a cushion of elastomeric material comprising a third arrangement of holes identical to the first arrangement of holes, wherein the holes of said third arrangement are configured for an at least partial reduction of the diameter via an axial deformation of the cushion of elastomeric material by said piston.

3. The gripping device according to claim 1, wherein said guide matrix is a first cup-shaped element that houses inside it said locking assembly.

4. The gripping device according to claim 3, moreover including a further cup-shaped element coupled to said first cup-shaped element and defining the first chamber.

5. The gripping device according to claim 1, wherein said guide matrix is a cup-shaped element that houses inside it said locking assembly and said piston, delimiting at least in part said first chamber.

6. The gripping device according to claim 5, wherein said first chamber is axially delimited by an end plate coupled to said guide matrix.

7. The gripping device according to claim 1, wherein:
   said piston comprises a plurality of axial tubular extensions fitting on said plurality of pins; and
   said locking assembly comprises a disk having a further arrangement of holes coaxial to the holes of the first and second arrangements of holes and each housing a respective insert of elastomeric material, each insert of elastomeric material being configured for deformation by a corresponding one of said axial tubular extensions.

8. The gripping device according to claim 1, wherein said piston is configured to be taken apart and includes a first shell and a second shell, which define, when coupled, said second chamber.

9. The gripping device according to claim 1, wherein said second supply port comprises a small tube fixed to said piston and mounted floating in an opening made on a side wall of said first chamber.

10. The gripping device according to claim 9, wherein said piston comprises a sealing gasket set between said first supply port and said opening.

11. The gripping device according to claim 1, wherein provided at the first end of the plurality of pins is a buffer.

12. The gripping device according to claim 11, wherein provided at the second end of the plurality of pins is an arrest element.

13. The gripping device according to claim 1, wherein said suction-cup is coupled in a removable way to said guide matrix.

14. A gripping equipment device designed for coupling to a wrist of a manipulator robot, comprising one or more suction-type gripping devices according to claim 1.

15. A method for gripping a component by a suction-type gripping device according to claim 1, comprising:

positioning the suction-cup in a pre-selected area of the component;

supplying the second chamber with fluid under pressure for controlling extraction of the plurality of pins;

reaching a condition of contact between said plurality of pins and a surface of the component in the pre-selected area;

supplying the first chamber with fluid under pressure for controlling advance of the piston in order to cause axial deformation of the locking assembly for locking the plurality of pins in the respective positions reached on a basis of the contact condition; and connecting the suction port to the negative-pressure source in order to fix the suction-cup to the component in the pre-selected area.

16. The method according to claim 15, wherein said supply of the second chamber with fluid under pressure for controlling extraction of the plurality of pins comprises reaching said condition of contact between the plurality of pins and the surface of the component in the pre-selected area, said suction-cup being coupled to the surface of the component.

17. The method according to claim 15, wherein said condition of contact between said plurality of pins and the surface of the component in the pre-selected area is reached prior to coupling of the suction-cup on the surface of the component in the pre-selected area.

\* \* \* \* \*